United States Patent [19]

Mitacek, deceased

[11] 3,846,394
[45] Nov. 5, 1974

[54] INTRODUCING CATALYST INTO A REACTOR

[75] Inventor: John Mitacek, deceased, late of Bartlesville, Okla. by Bill Mitacek, administrator

[73] Assignee: Phillips Petroleum Company, Bartlesville, Okla.

[22] Filed: June 6, 1973

[21] Appl. No.: 367,507

Related U.S. Application Data

[63] Continuation of Ser. No. 56,930, July 21, 1970, abandoned.

[52] U.S. Cl. .......... 260/93.7, 23/288 E, 260/88.2 R, 260/94.9 B, 260/94.9 C, 260/94.9 P
[51] Int. Cl. .............................. C08f 1/56, C08f 1/98
[58] Field of Search ............. C08f/3/10; 260/94.9 P, 260/94.9 B, 93.7, 88.2 R; 23/288 E

[56] References Cited
UNITED STATES PATENTS
2,347,271  4/1944  Linn .................................. 23/288 E
3,008,938  11/1961  Irvin ................................ 260/94.9 P
3,167,398  1/1965  Whittington ........................ 23/285
3,203,943  8/1965  Houser et al. .................... 260/94.9 P
3,257,363  6/1966  Miller et al. ..................... 260/94.9 P
3,636,326  1/1972  Smith et al. ..................... 260/94.9 P
3,726,845  4/1973  Nickerson ....................... 260/94.9 B FOREIGN PATENTS OR APPLICATIONS
231,502  11/1960  Australia ........................ 260/94.9 P

*Primary Examiner*—Joseph L. Schofer
*Assistant Examiner*—A. Holler

[57] ABSTRACT

Catalyst component poisoning is precluded and increased productivity in a polymerization system is obtained by flushing the catalyst component feed conduit with a diluent inert to the catalyst component, said diluent being introduced into said conduit downstream of the catalyst metering zone.

9 Claims, 1 Drawing Figure

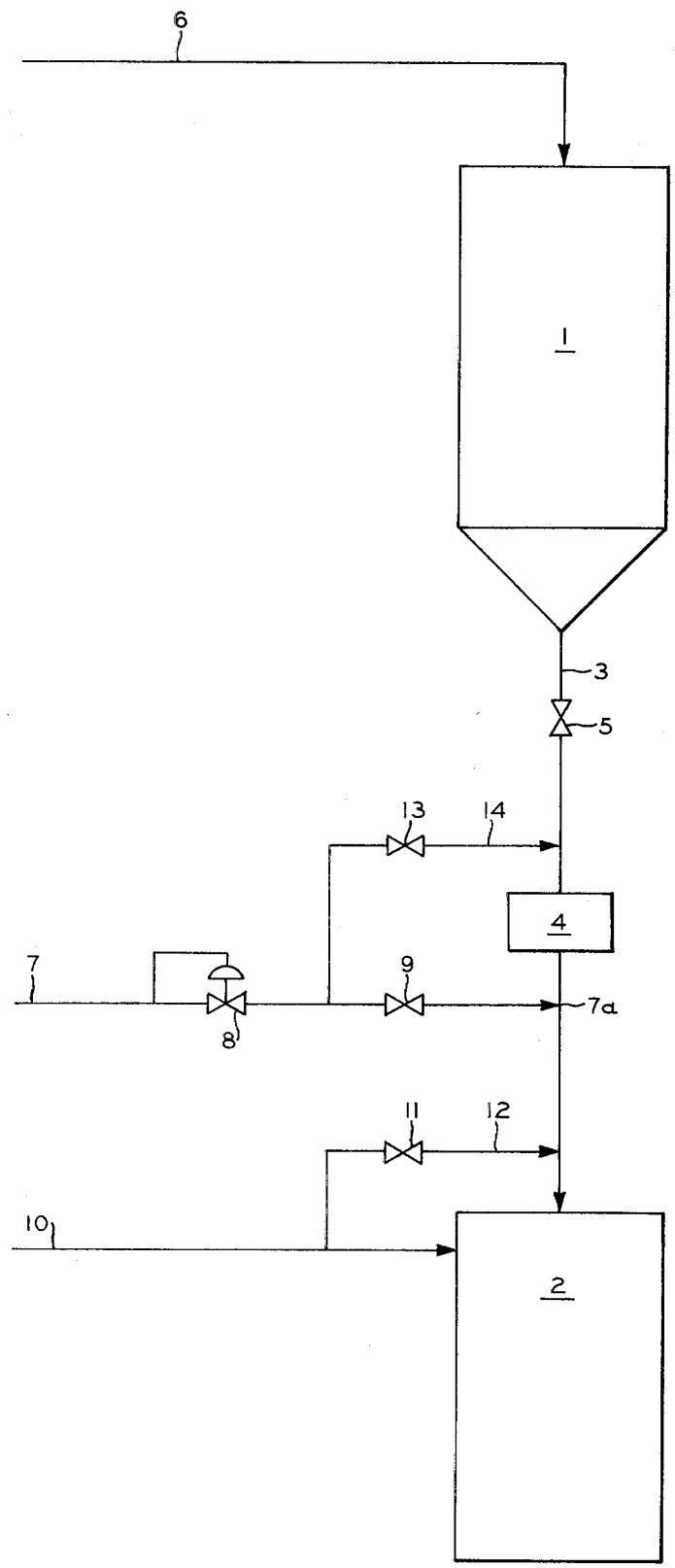

INTRODUCING CATALYST INTO A REACTOR

This application is a continuation of my application Ser. No. 56,930 filed July 21, 1970, now abandoned.

This invention relates to catalytic reactions. It further relates to the introduction of catalyst into a reactor. It specifically relates to a method for introducing measured quantities of slurried catalyst into a reactor whereby back flow of monomer or other contents of the reactor into the catalyst storage zone is prevented.

In the polymerization of certain hydrocarbon monomers a catalyst is utilized to promote the polymerization reaction. It is well known that the polymerization is quite sensitive to the quantity of catalyst utilized, and it is also known that the production rate can be controlled by controlling the rate of catalyst feed to the reaction. Accordingly, advantage has been taken of this knowledge by devising methods and apparatus for accurate catalyst feeding rate and for provision of positive catalyst feed to the reactor. One such apparatus for metering catalyst to a reactor is set out in U.S. Pat. No. 3,167,398. After a measured quantity of catalyst is passed through the metering equipment, it has, according to the practice of the prior art, been swept to the reaction vessel by a portion of the monomer. This technique of transferring catalyst from the metering equipment to the reactor by monomer sweep has met with limited success in that one problem inherent in this technique is that monomer tends to become trapped in and back flow through the metering equipment and into the catalyst storage vessel. This premature contact of monomer with catalyst in the catalyst storage vessel contaminates the catalyst, decreasing its activity, which thus reduces the polymer yield in the reactor.

It is thus an object of this invention to provide an improved method for feeding catalyst to a reactor.

In accordance with this invention there is provided the positive prevention of premature contact between catalyst components and monomer which is effected by introducing a stream of material, such as a hydrocarbon diluent, inert to the catalyst, into at least one location between the catalyst storage vessel and the reactor and/or the location of introduction of monomer where monomer is used to sweep catalyst to the reactor. The inert diluent is introduced continually — both during the introduction of catalyst to the reaction and during the time preceding and succeeding the introduction of catalyst. The diluent serves to sweep the catalyst to the reactor as well as performing its main function, which is as a positive force opposing the back flow of monomer or reactor product to the catalyst storage.

The method of this invention is readily understood by reference to the FIGURE, which is a flow diagram indicating the movement of catalyst from a catalyst storage zone through a catalyst metering zone and to a reaction zone.

Referring now to the FIGURE, catalyst contained in catalyst storage zone 1 is transferred to reaction zone 2 through conduit 3 having disposed therein metering zone 4 and valve 5. The transfer from storage zone 1 to reaction zone 2 is accomplished by utilizing an applied pressure drop between storage zone 1 and reaction zone 2. The pressure differential is applied by introducing into storage zone 1 via conduit 6 a diluent inert to the catalyst. The pressure applied to storage zone 1 is sufficient to overcome any opposing pressure in reaction zone 2; accordingly when valve 5 and metering zone 4 are open, catalyst will flow from storage zone 1 in conduit 3 to reaction zone 2. Conduit 7, also containing diluent inert to the catalyst, preferably the same utilized to transfer catalyst from storage zone 1, having disposed therein motor valve 8 and valve 9, intersects conduit 3 intermediate metering zone 4 and reaction zone 2.

Catalyst leaving storage zone 1 is contacted with diluent inert to the catalyst in at least one diluent addition zone, such as zone 7a at the intersection of conduits 3 and 7, said diluent addition zone being downstream of catalyst storage zone 1 and preferably intermediate metering zone 4 and reaction zone 2. The diluent entering conduit 3 from conduit 7 is utilized to sweep catalyst toward reaction zone 2 and to prevent monomer or other contaminants from entering storage zone 1 via conduit 3. The introduction of diluent is on a continuous basis proceeding before, during and after actual introduction of catalyst into reaction zone 2. The rate of introduction of diluent from conduit 7 into conduit 3 during catalyst introduction is such that the relationship between diluent entering the diluent addition zone and catalyst passing through metering zone 4 is sufficient to provide a stream of diluent and catalyst flowing toward reaction zone 2. Where the material being transferred from storage zone 1 to reaction zone 2 is a titanium trichloride catalyst component and the diluent is hexane, then the rate of introduction is in the range of 0.1 to 250 gallons of diluent per pound of catalyst component. The rate of diluent introduction before and after catalyst introduction need not be as great as during catalyst introduction. The diluent flow rate during these periods need only be great enough to provide flow toward the reaction zone. The rate of diluent flow from conduit 7 into conduit 3 is controlled by motor valve 8 in response to appropriate flow control equipment. It is thus seen that diluent is not only used to provide the pressure drop required to transfer catalyst from zone 1 to reaction zone 2, but it is also used to sweep catalyst in conduit 3 to reaction zone 2. In addition, the constant flow of diluent in conduit 3 toward reaction zone 2 prevents the contents of reaction zone 2 from back flowing in conduit 3 through metering zone 4, valve 5, and into storage zone 1.

If desired, at least a portion of monomer which is introduced into reaction zone 2 by conduit 10 can be diverted from conduit 10 through valve 11 and conduit 12 and introduced into conduit 3. Monomer introduced into conduit 3 from conduit 12 is contacted with catalyst and diluent in a zone upstream of reaction zone 2 and downstream of diluent addition zone 7a.

In another aspect of this invention, diluent is diverted from conduit 7 through valve 13 and conduit 14 and introduced into conduit 3 between metering zone 4 and valve 5. This mode of operation is useful when the quantity of catalyst desired to be transferred from storage zone 1 to reaction zone 2 has been completely accomplished and the diluent flow is being used to prevent back flow in conduit 3. In this situation, valve 5 is closed, valve 13 is open, valve 9 can be open or closed, and the diluent entering from conduit 14 flows toward reaction zone 2 through metering zone 4 and in this manner also serves to flush residual catalyst out of metering zone 4.

Metering zone 4 can be any one of the constant volume feeders known in the art. It can be manually operated or operated by automatic means. A typical metering device operative in metering zone 4 is a ball feeder of the type described in U.S. Pat. No. 3,167,398 which features a body having an inlet and an outlet, a member containing a metering chamber rotatable within the body, a chamber extending between and communicating with the inlet and outlet in at least two positions and a piston slidably fitted into the chamber and movable responsive to flow through the inlet to close the outlet in each of the noted positions. The above description can take the form of a valve being fitted with a plug, said plug being drilled such that the drilled portion of the plug can be positioned to provide a clear opening from inlet to outlet of the valve. The drilled portion of the plug is then fitted with a piston, which can take the form of a ball, and seats such that the ball can rest against the seat on either the inlet or outlet side of the valve. In operation, material under pressure, such as in this case a slurried catalyst, enters the valve body through the inlet side thus driving the ball toward the outlet side, causing the ball to seat against the above-described ball seats. In this position there is provided a fixed volume available for catalyst to occupy. When the material in the space is desired to be admitted to the outlet portion of the valve, the plug is rotated and positioned such that the material side of the valve is positioned on the outlet and the ball side is positioned facing the inlet of the valve. At this point, the pressure on the inlet side forces the ball toward the outlet side of the valve, which in turn forces the material in the space out of the valve body.

This invention is especially applicable to the process of feeding catalyst to a polymerization process. In such a process the reactant can be a hydrocarbon monomer suitable for polymerization — such monomers ordinarily being those having 2 to 8 carbon atoms per molecule, such as propylene, butylene, ethylene, pentene, butadiene, isoprene and the like. Also, such a polymerization involves feeding catalyst to the reactor slurried in diluent. Diluents useful for this purpose include alkanes having 3 to 10 carbon atoms per molecule, for example butane, pentane, hexane, heptane and the like. The method of this invention is particularly suited for using the same diluent used in slurrying the catalyst to sweep the slurried catalyst from the metering zone to the reaction zone.

Where the monomer being polymerized is propylene it is preferred to use hexane or pentane as the diluent.

Examples 1 and 2, below, which are both taken from continuous flow runs, serve to illustrate the increase in polymer productivity when an inert diluent is used to prevent monomer from entering the catalyst storage vessel.

In Example 1, in which diluent was not used to prevent monomer back flow, propylene, a titanium trichloride catalyst component complex having the formula $TiCl_3 \cdot 1/3 AlCl_3$, diethylaluminum chloride and triphenyl phosphite were combined in accordance with the following recipe and procedure.

Example 1

Polymerization Recipe:
| | |
|---|---|
| Propylene | 8 gallons per hour |
| Ti Complex ($TiCl_3 \cdot 1/3 AlCl_3$) | 0.011 to 0.0176 lb/hr. |
| Diethylaluminum chloride (DEAC) | 4 moles per mole Ti complex |
| Triphenyl phosphite (TPP) | 0.1 mole per mole Ti complex |

PROCEDURE:

Propylene was introduced directly into a 26-gallon pipeloop reactor at the rate of 4 gallons per hour. The remaining propylene was also introduced at the rate of 4 gallons per hour, but this quantity was introduced via the line from the catalyst feeder valve, which was one as shown in U.S. Pat. No. 3,167,398, at a point intermediate the feeder valve and the reactor. Ti complex was continuously passed through the feeder valve to the reactor at the rate of 0.0176 pounds per hour for the first 24 hours of operation and at the rate of 0.011 pounds per hour during the second 24 hours of operation. DEAC was introduced directly into the reactor at rates in proportion to the Ti rate such that 4 moles of DEAC were introduced per mole of Ti. TPP, a catalyst adjuvant described in U.S. Pat. No. 3,502,634, was introduced directly into the reactor at rates in proportion to the Ti rate such that 0.1 mole of TPP was introduced per mole of Ti complex.

Hexane at approximately 700 psig was used to transfer the Ti from the storage vessel to and through the feeder valve. The portion of propylene introduced between the feeder valve and the reactor then swept catalyst from the feeder valve to the reactor.

The reactor temperature and pressure were maintained at approximately 150° F. and 550 psig, respectively.

This being a continuous flow process, polymer product was continuously removed. Knowing the total weight of polymer produced and catalyst fed at any particular time, productivity was determined in terms of pounds of polymer produced per pound of Ti complex introduced.

The results of Example 1 are shown in Table 1, below.

Table 1

| Accumulative Run Time, Hours | Hexane Flush, Gal/Hour | Ti Complex, Pounds, Hour | Productivity, Lb.Polymer/ Lb.Catalyst | TPP, Moles/Mole of Catalyst |
|---|---|---|---|---|
| 6 | 0 | 0.0176 | 780 | 0.1 |
| 18 | 0 | 0.0176 | 890 | 0.1 |
| 24 | 0 | 0.0176 | 480 | 0.1 |
| 42 | 0 | 0.011 | 1200 | 0.1 |
| 48 | 0 | 0.011 | 1040 | 0.1 |

EXAMPLE 2

In Example 2, in which hexane was used to prevent monomer back flow, propylene, a titanium trichloride catalyst component complex having the formula TiCl₃·1/3AlCl₃, diethylaluminum chloride, and triphenyl phosphite were combined in accordance with the following recipe and procedure:

Polymerization Recipe:
    Propylene                          8 gallons per hour
    TiCl₃·1/3AlCl₃                     0.006 lb/hr.
    Diethylaluminum chloride (DEAC)    4 moles per mole catalyst complex
    Triphenyl phosphite (TPP)          variable
    Hexane (flush)                     1.5 gallons per hour

PROCEDURE:

Utilizing the procedure of Example 1, hexane was introduced downstream of the catalyst feeder valve between the feeder valve and the point of introduction of the portion of propylene utilized to sweep catalyst to the reactor. Hexane, introduced at this point for the purpose of preventing propylene back flow into the catalyst storage vessel, was fed at the rate of 1.5 gallons per hour and at a pressure of approximately 700 psig.

Ti feed rate during the entire 48-hour run was held at 0.006 pound per hour; however, TPP was varied.

Table 2 below gives the results of Example 2.

Table 2

| Accumulative Run Time, Hours | Hexane Flush, Gal/Hour | Ti Complex, Pounds/Hour | Productivity, Lb.Polymer/ Lb.Catalyst | TPP, Moles/Mole of Catalyst |
|---|---|---|---|---|
| 6  | 1.5 | 0.006 | 1150 | 0.18 |
| 12 | 1.5 | 0.006 | 1420 | 0.11 |
| 18 | 1.5 | 0.006 | 1420 | 0.11 |
| 24 | 1.5 | 0.006 | 1700 | 0.11 |
| 30 | 1.5 | 0.006 | 1500 | 0.11 |
| 36 | 1.5 | 0.006 | 1500 | 0.05 |
| 42 | 1.5 | 0.006 | 1500 | 0.05 |
| 48 | 1.5 | 0.006 | 1500 | 0.05 |

Without hexane flush, the productivity is seen in Table 1 to vary from 480 to 1,200 lb/lb. As productivity increased, it was necessary to decrease catalyst input rate from 0.0176 to 0.011 lb/hr. to maintain an approximately constant rate of polymer product.

During Example 2 employing hexane flush, the productivity is observed in Table 2 to have increased to values ranging from 1,150 to 1,700 lb/lb., thus averaging about double the values obtained in Example 1. This improvement in productivity permitted the catalyst to be decreased to 0.006 lb/hr. while still producing the same amount of polymer per hour. This is highly desirable in that catalyst costs are thereby reduced by one-half and, more importantly, only half as much catalyst residue is left in the polymer. Thus, the cost of catalyst removal from polymer is greatly reduced.

Reasonable variations and modifications are possible within the scope of my invention which sets forth a method for positively preventing the back flow of monomer or reactor product into the catalyst storage zone.

That which is claimed is:

1. In a process for the introduction of at least one constituent of a catalyst system and a diluent into a reactor wherein at least a first portion of said diluent forms a slurry of said catalyst constituent and wherein said slurry of said catalyst constituent and said first portion of diluent is transferred from a storage zone for said slurry of said catalyst constituent and said diluent to a metering zone, passed through said metering zone and thereafter introduced into said reaction zone, the improvement which comprises continually introducing a second portion of said diluent into said reaction zone by way of a first diluent addition zone intermediate of said metering zone and said storage zone for a slurry of said catalyst constituent and said first portion of said diluent whereby said second portion of diluent and slurry of said first portion of diluent and said catalyst constituent are passed through said metering zone and into said reaction zone.

2. A process according to claim 1 wherein a further portion of said diluent is additionally introduced into said reaction zone by way of a second diluent addition zone intermediate said metering zone and said reaction zone.

3. A process according to claim 2 wherein a polymerization reaction is conducted in said reaction zone.

4. A process according to claim 3 wherein a hydrocarbon monomer suitable for polymerization having 2 to 8 carbon atoms per molecule is polymerized.

5. The process of claim 4 wherein said diluent is an alkane having 3 to 10 carbon atoms per molecule.

6. The process of claim 5 wherein said monomer is propylene.

7. The process of claim 6 wherein said diluent is hexane.

8. The process of claim 5 wherein said diluent is pentane.

9. The process of claim 8 wherein said catalyst constituent is a titanium trichloride complex having the approximate formula TiCl₃·1/3AlCl₃.

* * * * *